No. 651,512. Patented June 12, 1900.
W. W. PHILBRICK.
MATCHER HEAD.
(Application filed Sept. 16, 1899.)
(No Model.)
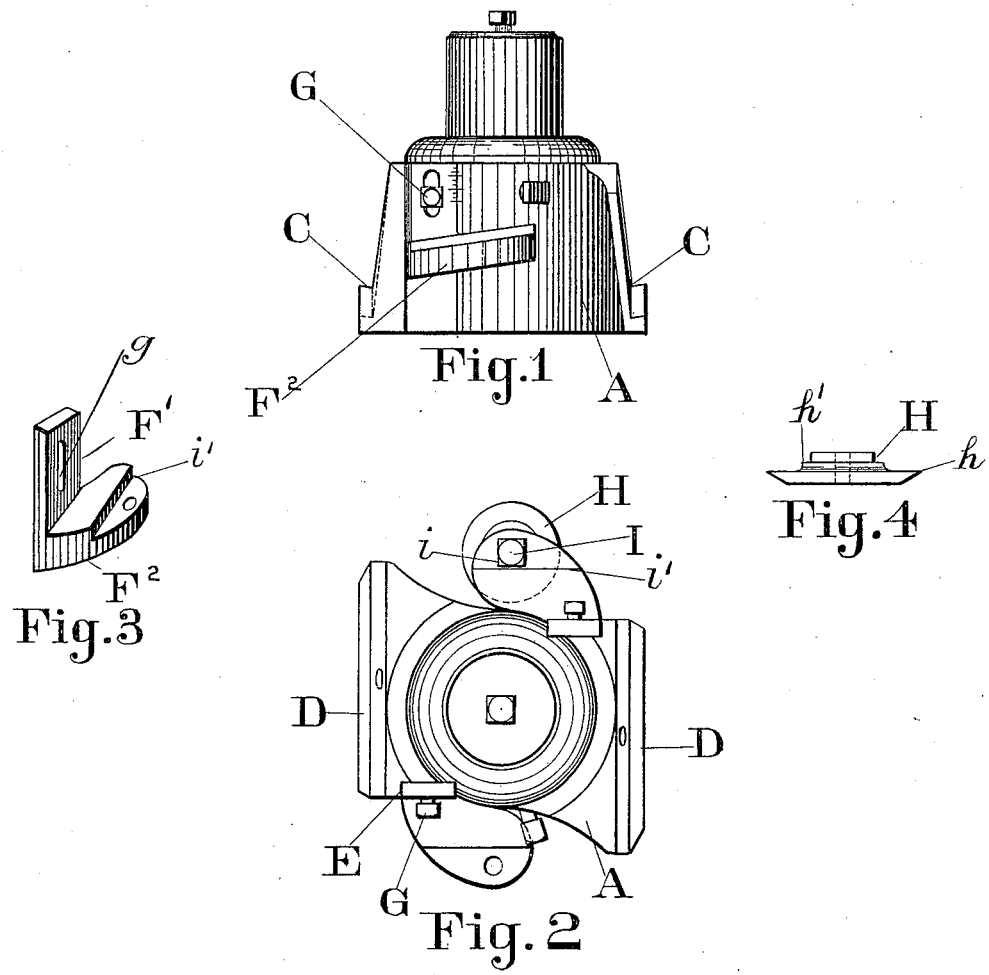
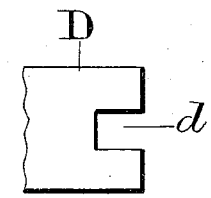
Fig.5
WITNESSES:
INVENTOR
Warren W. Philbrick
BY
Geo. H. Parmelee
his ATTORNEY.
THE NORRIS PETERS CO., PHOTO-LITHO., WASHINGTON, D. C.

UNITED STATES PATENT OFFICE.

WARREN W. PHILBRICK, OF SEATTLE, WASHINGTON.

MATCHER-HEAD.

SPECIFICATION forming part of Letters Patent No. 651,512, dated June 12, 1900.

Application filed September 16, 1899. Serial No. 730,768. (No model.)

*To all whom it may concern:*

Be it known that I, WARREN W. PHILBRICK, of Seattle, in the county of King and State of Washington, have invented a new and useful Improvement in Matcher-Heads, of which the following is a full, clear, and exact description, reference being had to the accompanying drawings, which form a part of this specification.

My invention relates to certain new and useful improvements in matcher-heads for use in tonguing, grooving, rabbeting, joining, and otherwise matching the edges of boards, and more particularly to matcher-heads of the character described and claimed in my patents of August 1, 1899, Nos. 629,813 and 629,814, and in my pending applications Serial Nos. 712,291 and 712,292, in which the work of matching the edges of boards is divided between jointing blades or cutters having a shearing cut toward the intermediate portion of the edges of boards and circular bits or cutters which form the tongue, groove, or rabbet.

The object of the present invention is to provide novel means for seating the circular bits intermediate the jointing blades or cutters and for adjusting the same to vary the degree of separation between the planes of the cutting edges of the said bits; and the invention consists in the novel construction and combination of parts, all as hereinafter described, and pointed out in the appended claims, reference being had to the accompanying drawings, in which—

Figure 1 is a side view of a matcher-head embodying my invention and adapted for the formation of tongues. Fig. 2 is a plan view of the same. Fig. 3 is a detail perspective view of one of the adjustable bit-seats detached, and Fig. 4 is a detail view of one of the bits. Fig. 5 is a detail view of one of the cutters.

In the drawings the letter A designates the head proper, secured to a rotary spindle in the usual manner and provided at opposite sides with shouldered seats C for the jointing blades or cutters D, slotted at $d$, to pass the tongue. The inner walls of said seats are inclined upwardly and inwardly toward the axis of the head, and the bottom walls are pitched downwardly the direction of rotation, these provisions being for the purpose of giving the straight cutting edges of the blades a shearing action downward from the upper edge of the board toward the tongue. For double-matched work, however, or work where the joint is to show from both sides it is preferred to use jointing-blades of the character described and claimed in my said patents of August 1, 1899, which have a shearing action from both surfaces of the board toward the tongue or groove.

Planed or otherwise formed as the sides of the head between the jointing-blades and adjacent to the rear end of the seats for the latter are vertical grooves or guides E to receive the vertical arms F' of bit-carriers F². These bit-carriers are shown as being somewhat in the shape of the letter L, the vertical arms fitting the said grooves or guides and the horizontal arms lying around against the sides of the head. They are secured to the head by means of cap or set screws G, which pass through vertical slots $g$ in the arms F' into the back walls of the grooves.

H designates the circular bits, which are similar to those employed in my said patents, having receding beveled cutting edges $h$ and shoulders $h'$ and seated in reversed positions on the under sides of the horizontal portions of the bit-carriers, being secured by bolts I, the upper ends of said bolts having angular heads $i$, which engage shoulders $i'$ on the bit-carriers, and thereby hold the bolts from turning in their seats. The bit-seating faces of the bit-carriers may be somewhat inclined, as shown, in order to give the bits clearance and cause them to cut somewhat deeper at the base of the tongue. In a grooving-head the bits will be flat cutting-disks of the character described in my said patents.

To vary the vertical distance between the cutting edges of the two bits, the screws G are loosened and the bit-carriers are moved up or down in the guides or grooves to the desired extent, which may be indicated by a scale marked on the head, after which the screws are again tightened. In this manner a tongue of any desired thickness or a groove of any desired width may be formed.

For special work I may of course use jointing blades and bits having cutting edges adapted to the particular work to be done.

The present improvement may be applied to various matcher-heads now in use by planing the guides or grooves in the head and providing the bit-carriers and bits.

In operation the jointing blades or cutters have a shearing action from the edge of the lumber toward the tongue, thereby preventing splitting, breaking, or chipping of the upper angles of the jointed edges, while the circular bits dress the faces of the tongue (or walls of the grooves) and throw out the shavings formed by the jointing-bits, preventing the latter from burning, as they otherwise would.

Having thus described my invention, what I claim as new, and desire to secure by Letters Patent, is—

1. In a matcher-head, the combination with the jointing-blades arranged to joint the vertical faces of the edges of the lumber, of independent bit-carriers secured to the head between the said jointing-blades, circular bits or cutters seated thereon and operating to impart a special configuration to the edges of the lumber, and means for adjusting said bit-carriers to vary the degree of separation of the cutting-planes of the said bits or cutters.

2. In a matcher-head, the combination with the head proper having jointing-blades arranged to make a shearing cut, of independent bit-carriers secured to opposite sides of the said head between the said blades, means for adjusting said carriers vertically and cutting-bits seated on the said carriers.

3. In a matcher-head, the combination with the head proper having jointing-blades arranged to make a shearing cut, of independent bit-carriers secured to opposite sides of the head intermediate the said blades, means for vertical adjustment of the said carriers, and cutting-bits seated in reversed positions upon the said carriers.

4. In a matcher-head, the combination with the head proper having jointing-blades secured to the wings, and intermediate of said blades upon its remaining sides vertical grooves or guides, of a bit-carrier seated in each groove or guide and vertically adjustable therein, and a cutting-bit secured to each of said bit-carriers.

5. In a matcher-head the combination of the head proper having jointing-blades secured to its wings, and intermediate of said wings, upon its remaining sides, vertical grooves or guides, an L-shaped bit-carrier adjustably secured in each of said grooves or guides, bolts passing through the horizontal portions of the said carriers and having angular heads engaging shoulders on said portions, and circular cutting-bits secured by the said bolts.

6. In a matcher-head, the combination of the jointing-blades secured to opposite sides of the said head and arranged to joint definite portions of the edges of the lumber, of independent bit-seats fixed one to each of the remaining sides of said head, and bevel-edge grooving-bits, one of which is secured to each of said seats, the two bits being seated reversely with respect to each other.

In testimony whereof I have affixed my signature in presence of two witnesses.

WARREN W. PHILBRICK.

Witnesses:
JOHN WALLACE,
JOHN KELLEHER.